Figure 1:
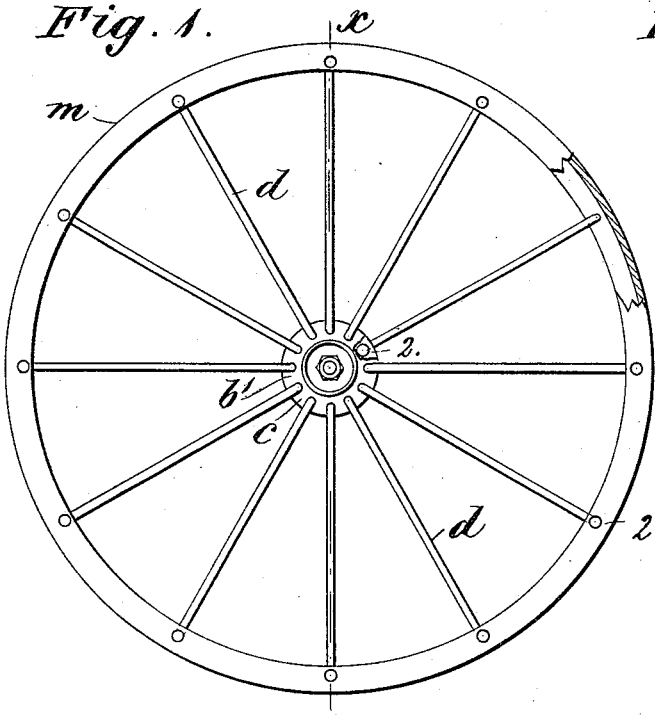

(No Model.)

A. C. MATHER.
VEHICLE WHEEL.

No. 452,046. Patented May 12, 1891.

Witnesses.
Charles G. Simpson
J. Millard

Inventor.
A. C. Mather

UNITED STATES PATENT OFFICE.

ALEXANDER CRAIG MATHER, OF MONTREAL, CANADA.

VEHICLE-WHEEL.

SPECIFICATION forming part of Letters Patent No. 452,046, dated May 12, 1891.

Application filed July 29, 1890. Serial No. 360,298. (No model.)

*To all whom it may concern:*

Be it known that I, ALEXANDER CRAIG MATHER, a subject of the Queen of Great Britain, residing at the city of Montreal, in the district of Montreal and Province of Quebec, Canada, have invented new and useful Improvements in Wheels; and I do hereby declare that the following is full, clear, and exact description of the same.

This invention has reference to improvements in that class of wheels for vehicles known as "suspension-wheels;" and the invention consists in the particular construction and arrangement of the parts as hereinafter set forth; and the object of my invention is to make such a construction of the wheel that the spokes of one hub will be exactly opposite the spokes in the other hub at the points where their outer ends connect with the rim, so that the transverse strain of the spokes on one side are sustained by corresponding strains of the spokes on the other side, thus relieving the rims from the bending strains they have heretofore been subject to, and such other advantages as will be hereinafter described and claimed.

In the drawings hereunto annexed similar letters and figures of reference indicate like parts.

Figure 2:
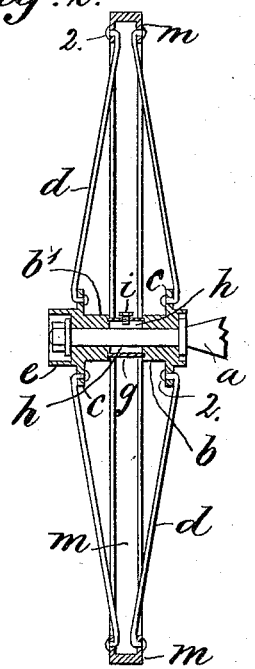
Figure 3:
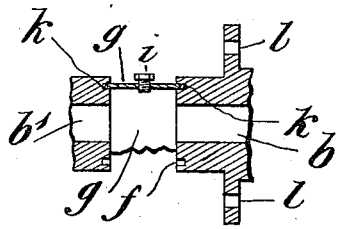

Figure 1 is an elevation of a wheel embodying my invention. Fig. 2 is a transverse section of the hub and rim, taken at line $x$, Fig. 1, also showing the attachment of the spokes $d$. Fig. 3 is a detail of the sleeve $g$.

Letter $a$ is an ordinary axle of a vehicle. To this is fitted the hubs $b\ b'$, each provided with a circular flange $c$ for attaching the spokes $d$ to, as will be hereinafter described. The hub $b'$ is preferably provided with a dust-guard $e$. Each of the hubs is provided with a groove $f$ to receive the ends of a sleeve $g$, which are fitted to each groove $f$ to form an oil-chamber $h$. To save expense in fitting the ends of the sleeve $g$ into the recesses $f$, so as to be perfectly oil or "water" tight, elastic or soft-metal washers $k$ may be placed in them, as shown in Fig. 3, so that it is only required to form the parts with ordinarily fair surfaces and the washer will render the joint tight.

The sleeve $g$ is provided with a plug $i$, preferably screwed into it, by removing which lubricants may be introduced into the chamber $h$, and by replacing the plug they are retained from escaping except by passing through between the axle and hubs.

The flanges $c$ are provided with eyes $l$, one for each of the spokes $d$. These consist of metallic bars bent (preferably by die-block) hot, so as to render them perfectly equal throughout. One end of each spoke is introduced into one of the eyes $l$. The other end is placed in an eye formed in the rim $m$, and the two ends are riveted over, as shown at 2 2, care being taken to have the eyes for the spokes in the rim $m$ for those which attach with the hub $b$ exactly opposite to the eyes for the spokes which connect with the hub $b'$, or as nearly so as can be conveniently obtained, so that the lateral strain of the spoke on the one side of the rim $m$ will pass directly through the cross-section of the rim, thereby avoiding the formation of a bending longitudinal strain.

After the rim and hubs $b\ b'$ have been attached together by the spokes, all made equal, particularly in length, the hubs are forced apart and the sleeve $g$ is put in place between them in the position shown in Figs. 2 and 3. The wheel is then ready to be placed upon the axle. By passing the ends of the spokes $d$ inside of the webs of the rim $m$ and riveting them on the outside, as shown at 2, they are protected from being injured by stones, &c., that may be on rough roads.

What I claim is as follows:

The combination, in a wheel, of the rim $m$, having a channel-section with spokes $d$ inserted in eyes therein from the inside of the webs of the rim and secured on the outside thereof, said eyes being situated circumferentially opposite one another in the webs, with hubs $b\ b'$, having eyes $l$ and grooves $f$ and packing $k$, also sleeves $g$, adapted to be put in place after the hubs $b\ b'$ have been forced apart to tighten the spokes $d$, and being further provided with a plug $i$, whereby it is also adapted to form a lubricating-chamber, the whole substantially as described.

ALEXANDER CRAIG MATHER.

Witnesses:
CHARLES G. C. SIMPSON,
J. MILLARD.